United States Patent [19]

Fischer et al.

[11] 4,127,705
[45] Nov. 28, 1978

[54] ELECTROCHEMICAL STORAGE CELL

[75] Inventors: Wilfried Fischer, Neckargemünd; Herbert Kleinschmager, Eppelheim; Wilhelm Haar, Sandhausen; Gert Weddigen, Heidelberg-Neuenheim, all of Germany

[73] Assignee: Brown, Boveri & Cie AG, Mannheim-Fäfertal, Germany

[21] Appl. No.: 817,379

[22] Filed: Jul. 20, 1977

[30] Foreign Application Priority Data

Jul. 24, 1976 [DE] Fed. Rep. of Germany ....... 2633454

[51] Int. Cl.$^2$ ........................................... H01M 10/39
[52] U.S. Cl. ................................................... 429/104
[58] Field of Search ............... 429/104, 102, 103, 191, 429/218

[56] References Cited

U.S. PATENT DOCUMENTS 3,679,480   7/1972   Brown et al. .................... 429/104
3,811,943   5/1974   Minck et al. .................... 429/104

Primary Examiner—Anthony Skapars
Attorney, Agent, or Firm—Herbert L. Lerner

[57] ABSTRACT

An electrochemical storage cell or battery based on an alkali metal and sulfur having at least one anode chamber and at least one cathode chamber separated from each other by an ion-conducting solid electrolyte, a felt fabric with capillary activity located in the cathode chamber, and an additive lowering the viscosity of the sulfur in the cathode chamber. Preferred additives are selenium, boron and iodine. Lowering the viscosity of the sulfur permits recharging the cell to a greater capacity.

9 Claims, 1 Drawing Figure

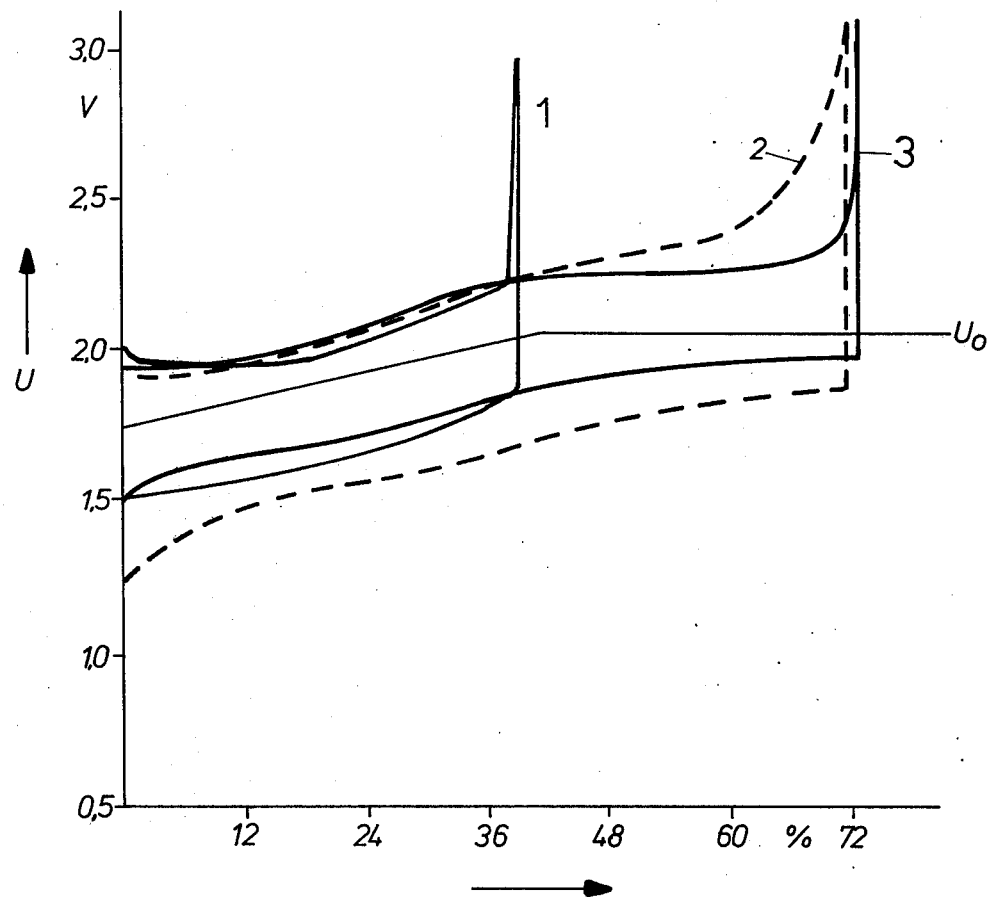

ELECTROCHEMICAL STORAGE CELL

BACKGROUND OF THE INVENTION

1. Field of the Invention

This invention relates to an electrochemical cell and more particularly refers to a new and improved electrochemical storage cell or battery based on alkali metal and sulfur with at least one anode chamber and at least one cathode chamber separated from each other by an ion-conducting solid electrolyte.

2. Description of the Prior Art

An electrochemical storage cell or battery based on alkali metal and sulfur having at least one anode chamber and one cathode chamber separated from each other by an ion-conducting solid electrolyte, and a felt fabric of graphite or carbon contained in the cathode chamber in addition to the sulfur is known in the art as shown by German Published Prosecuted Application No. 1 671 760.

The purpose of the felt fabric is to increase the boundary surface necessary for the electrochemical reaction, between the sulfur or the alkali polysulfide produced during the discharge, and the cathodic current collector, of which the felt fabric can be considered as an extension. In addition, this makes the distance between the electrolyte and the cathodic current collector, extended in this manner, small, so that the resistance of the sulfur or the sodium polysulfide contributes less to the cell's internal resistance.

An important disadvantage of such a cell is, however, that it can be only partially recharged with large currents. In a Na/S cell, for instance, this disadvantage is related to the fact that sulfur (with small percentages of dissolved $Na_2S_5$) and $Na_2S_5$ (with percentages of dissolved sulfur) form two immiscible liquids at the operating temperature of such a cell, which is between 300° and 350° C. For, if a discharged Na/S cell, which contains $Na_2S_3$ in the cathode chamber, is recharged, then sulfides with more sulfur are formed first until $Na_2S_5$ has been produced in the entire cathode chamber or at least locally. Upon further charging, liquid sulfur is then produced at the points with a high electrochemical reaction rate. The sulfur being an insulator, blocks the electrochemical processes at these points.

In storage cells with high current densities, such as are presently planned for covering peak loads in electrical networks, recharging as rapidly and completely as possible is of special importance.

SUMMARY OF THE INVENTION

An object of the present invention is to provide an electrical storage cell or battery based on an alkali metal and sulfur wherein there is greater mobility of the two molten phases in the cathode chamber with prevention of major accumulations of liquid sulfur as an insulator and reduced internal resistance.

With the foregoing and other objects in view, there is provided in accordance with the invention an electrochemical storage cell or battery based on an alkali metal and sulfur having at least one anode chamber and at least one cathode chamber separated from each other by an ion-conducting solid electrolyte, a felt fabric of a medium with capillary activity contained in the cathode chamber, and an additive lowering the viscosity of the sulfur in the cathode chamber.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing in which is shown charging/discharging curves of different electrochemical storage cells.

DETAILED DESCRIPTION OF THE INVENTION

To an electric cell or battery of the alkali metal and sulfur type is added a substance which causes lowering the viscosity of the sulfur. The addition of selenium and/or boron has been found particularly advantageous, as well as, in individual cases, the addition of iodine. If selenium is used, the addition of a quantity of 0.2 to 10 mol % selenium, referred to the sulfur content, is advisable. If boron is added, the preferred quantity is 0.1 to 2 mol %. In the case of iodine, a quantity of 0.2 to 2 mol % is best used. In each case the quantities are based on the sulfur content in the cathode chamber. Quantities less than 0.1 mol % have generally not been found effective. With the use of larger quantities, there is danger of undesired reactions or side-effects occurring. Boron can also be added in the form of the sulfide or of other compatible compounds.

The cells can be constructed so that the entire cathode chamber or only a part thereof is filled with a medium having capillary activity. In general, graphite or carbon felt fabric is used. It has been found advantageous to use relatively large-pore felt in the region near the solid electrolyte and relatively fine-pore felt in the region farther away. An average fiber spacing of 1 to 4 mm or more has been found advantageous in the large-pore region near the electrolyte and an average fiber spacing of 0.1 to 0.2 mm or less in the fine-pore region away from the electrolyte.

A series of tests tabulated in the Table show to what extent the rechargeability can be increased by the measures in accordance with the invention. As 100 % rechargeable are defined such cells, in which the composition of the melt in the cathode chamber can be changed during the charging from $Na_2S_3$ to sulfur.

The tests were carried out in Na/S cells with $\beta$-$Al_2O_3$ tubes, 9 cm long and closed at the bottom and having an outside diameter of 11 mm and an inside diameter of 9 mm. At the top, the tubes were fused to glass. They were in a glass vessel with a cup-shaped cathodic current collector.

The 4-mm wide gap between the current collector and the electrolyte tube was filled with graphite felt (fiber diameter, 20 $\mu$m; porosity, about 95%). In two cases, vertical channels were provided in the felt. Sodium was filled into the electrolyte tube and sulfur into the outer space. The tests were performed at 300° C. There was pure nitrogen above the melts.

Table

Dependence of the rechargeability on parameters of the sulfur electrode (300° C, 40 mA/cm$^2$)

| Test No. | | Rechargeability in % | |
|---|---|---|---|
| | | 40 mA/cm$^2$ | 65 mA/cm$^2$ |
| 1 | no additive cathode chamber with homogeneous felt structure | 38 | |
| 2 | Additive: 1 mol % B$_2$S$_3$ cathode chamber with homogeneous felt structure | 64 | |
| 3 | Additive: 1 mol % Se cathode space with homogeneous felt structure | 75+) | |
| 4 | no additive vertical channels in felt | 66 | 30 |
| 5 | Additive: 1 mol % Se vertical channels in felt (channel cross section about 4 mm$^2$) | 85 | 64 |

+) 52% with 120 mA/cm$^2$ charging current density

As seen from the Table, the rechargeability can be increased considerably by additives. From Tests 4 and 5 it will be noted that the rechargeability becomes particularly high with a combination of additives and vertical channels in the felt. Although the rechargeability drops with increasing charging current density, the rechargeability is substantially higher under this condition than in cells without additives.

The drawing shows charging/discharging curves of different cells. Curve 1 relates to the standard cell, which has homogeneous felt distribution but otherwise contains no additives. In the case of Curve 2, 0.8 mol % selenium were added to the sulfur. In Curve 3 there is an addition of 1.6 mol % selenium.

Plotted along the abscissa is the relative capacity of the cell, which is understood to be the ratio of the measured capacity to the theoretical capacity. The theoretical capacity is that capacity which is obtained if the overall stoichiometry in the cathode space is changed during the discharge from pure sulfur to Na$_2$S$_3$.

A comparison of the curves shows that the rechargeability is improved decisively with no further increase taking place above 0.8 mol % selenium with the current density of 40 mA/cm$^2$ chosen here.

The substances mentioned can be used advantageously also in combination, especially also with other known viscosity-lowering substances. The substances selected should have long-term stability at the operating temperature and there should be compatibility with the melt.

There are claimed:

1. In an electrochemical storage cell or battery based on an alkali metal and sulfur having at least one anode chamber and at least one cathode chamber separated from each other by an ion-conducting solid electrolyte, and a felt fabric of a medium with capillary activity contained in the cathode chamber, the improvement which comprises having an additive lowering the viscosity of the sulfur in the cathode chamber and wherein the additive is selenium in an amount of 0.2 to 10 mol % selenium based on the sulfur content.

2. Storage cell according to claim 1, wherein the cathode chamber also contains boron in an amount of 0.1 to 2 mol % boron based on the sulfur content.

3. Storage cell according to claim 1, wherein the cathode chamber also contains iodine in an amount of 0.2 to 2 mol % iodine based on the sulfur content.

4. Storage cell according to claim 1, wherein the medium with capillary activity is graphite or carbon.

5. Storage cell according to claim 4, wherein said felt in the region near the solid electrolyte has pores or cavities which are large as compared to the remaining region of the felt further away from the solid electrolyte.

6. Storage cell according to claim 1, wherein said alkali metal is sodium.

7. In an electrochemical storage cell or battery based on an alkali metal and sulfur having at least one anode chamber and at least one cathode chamber separated from each other by an ion-conducting solid electrolyte, and a felt fabric of a medium with capillary activity contained in the cathode chamber, the improvement which comprises having an additive lowering the viscosity of the sulfur in the cathode chamber and wherein the additive is boron in an amount of 0.1 to 2 mol % boron based on the sulfur content.

8. Storage cell according to claim 7, wherein the cathode chamber also contains iodine in an amount of 0.2 to 2 mol % iodine based on the sulfur content.

9. In an electrochemical storage cell or battery based on an alkali metal and sulfur having at least one anode chamber and at least one cathode chamber separated from each other by an ion-conducting solid electrolyte, and a felt fabric of a medium with capillary activity contained in the cathode chamber, the improvement which comprises having an additive lowering the viscosity of the sulfur in the cathode chamber and wherein the additive is iodine in an amount of 0.2 to 2 mol % iodine based on the sulfur content.

* * * * *